United States Patent [19]
Altrock

[11] Patent Number: 6,018,863
[45] Date of Patent: Feb. 1, 2000

[54] FASTENER INSTALLATION HEAD HAVING A PIVOTING FASTENER DRIVE ASSEMBLY

[75] Inventor: Nick L. Altrock, Howell, Mich.

[73] Assignee: Fabristeel Products, Inc., Southfield, Mich.

[21] Appl. No.: 09/226,492

[22] Filed: Jan. 7, 1999

Related U.S. Application Data

[60] Provisional application No. 60/070,641, Jan. 7, 1998.

[51] Int. Cl.$^7$ .................................................. B23Q 15/00
[52] U.S. Cl. ................................ 29/716; 29/798; 29/818; 227/144
[58] Field of Search .............................. 29/798, 809, 813, 29/816, 716, 818; 227/112, 144, 148; 198/409

[56] References Cited

U.S. PATENT DOCUMENTS

| | | |
|---|---|---|
| 3,517,477 | 6/1970 | Thornton . |
| 3,518,865 | 7/1970 | Konstantinov . |
| 3,655,070 | 4/1972 | Haydu . |
| 3,658,230 | 4/1972 | Enock . |
| 4,463,889 | 8/1984 | Startran . |
| 4,495,841 | 1/1985 | Mori et al. . |
| 4,551,913 | 11/1985 | Campisi . |
| 4,561,506 | 12/1985 | Booker . |
| 4,765,175 | 8/1988 | Denham et al. . |
| 4,819,326 | 4/1989 | Stannek . |
| 4,901,431 | 2/1990 | Gast . |
| 5,104,024 | 4/1992 | Brewer et al. . |
| 5,123,825 | 6/1992 | Ernst . |
| 5,172,467 | 12/1992 | Muller . |

FOREIGN PATENT DOCUMENTS

| | | |
|---|---|---|
| 6-226563 | 8/1994 | Japan . |

*Primary Examiner*—David P. Bryant
*Attorney, Agent, or Firm*—Howard & Howard

[57] ABSTRACT

The installation head of the present invention has a pivoting driver which pivots from the fastener loading position to the installation position. By pivoting the driver to the load position, fasteners can be loaded into the driver in proper orientation for installation, the installation head can be used to install fasteners at any orientation, and the installation head is more compact. The head includes a fastener feed that receives fasteners and delivers them to the driver when the driver has been rotated to the load position. The fastener feed and the driver cooperate to provide simultaneous alignment and control of the fastener. The feed includes jaws that open slightly to orient the fastener for initial loading and then open wider to avoid obstructing the fastener as it is finally pushed into the driver. Once the fastener is fully pushed into the driver, the driver pivots to the installation position for installing the fastener into a workpiece.

18 Claims, 9 Drawing Sheets

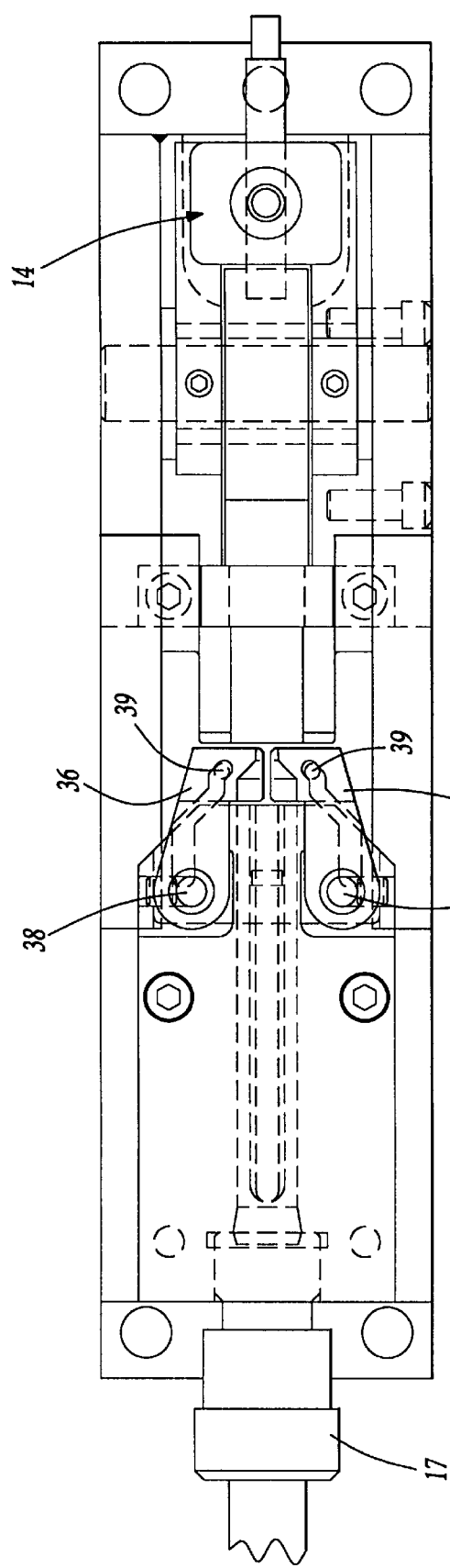
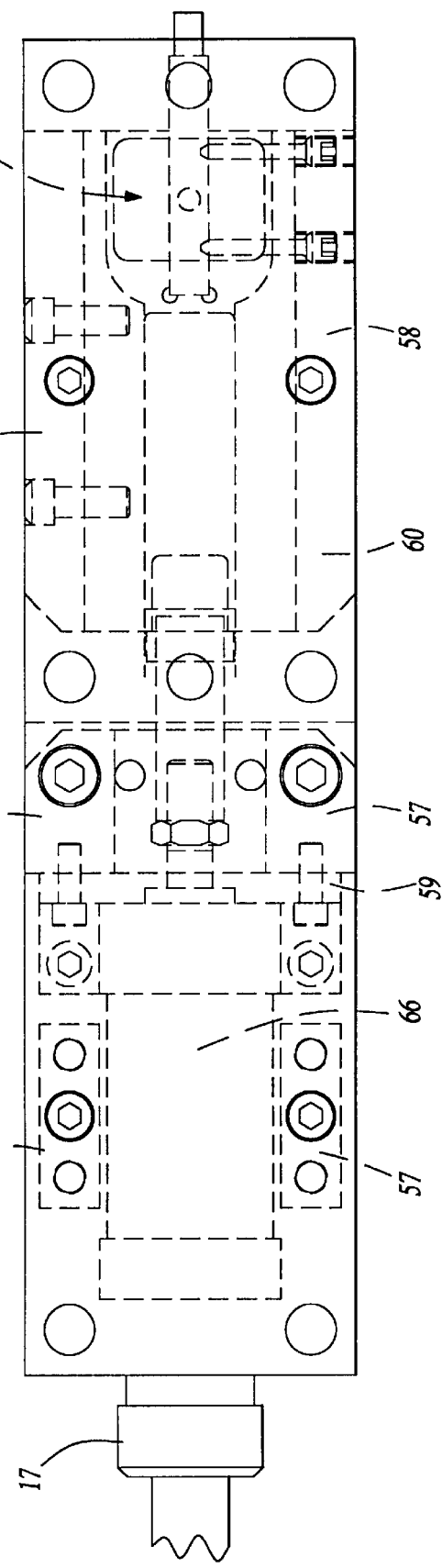

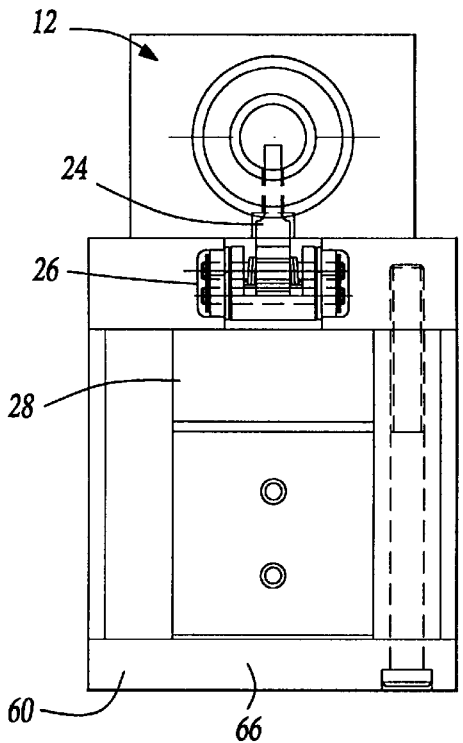
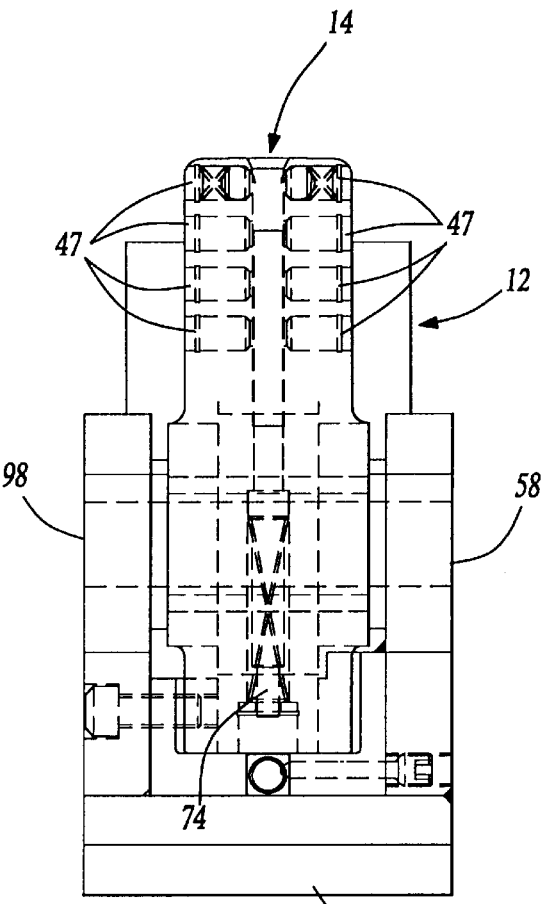
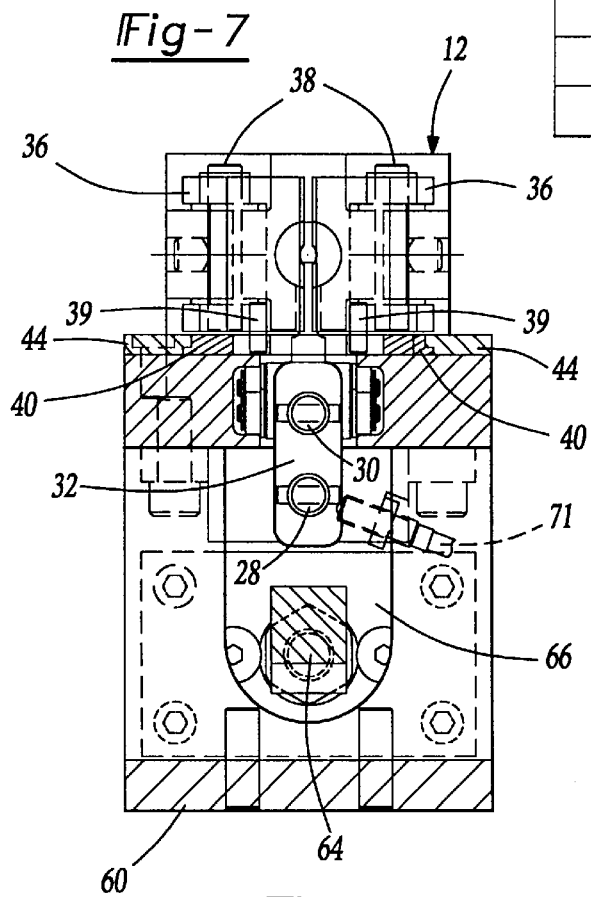
Fig-7
Fig-8
Fig-9

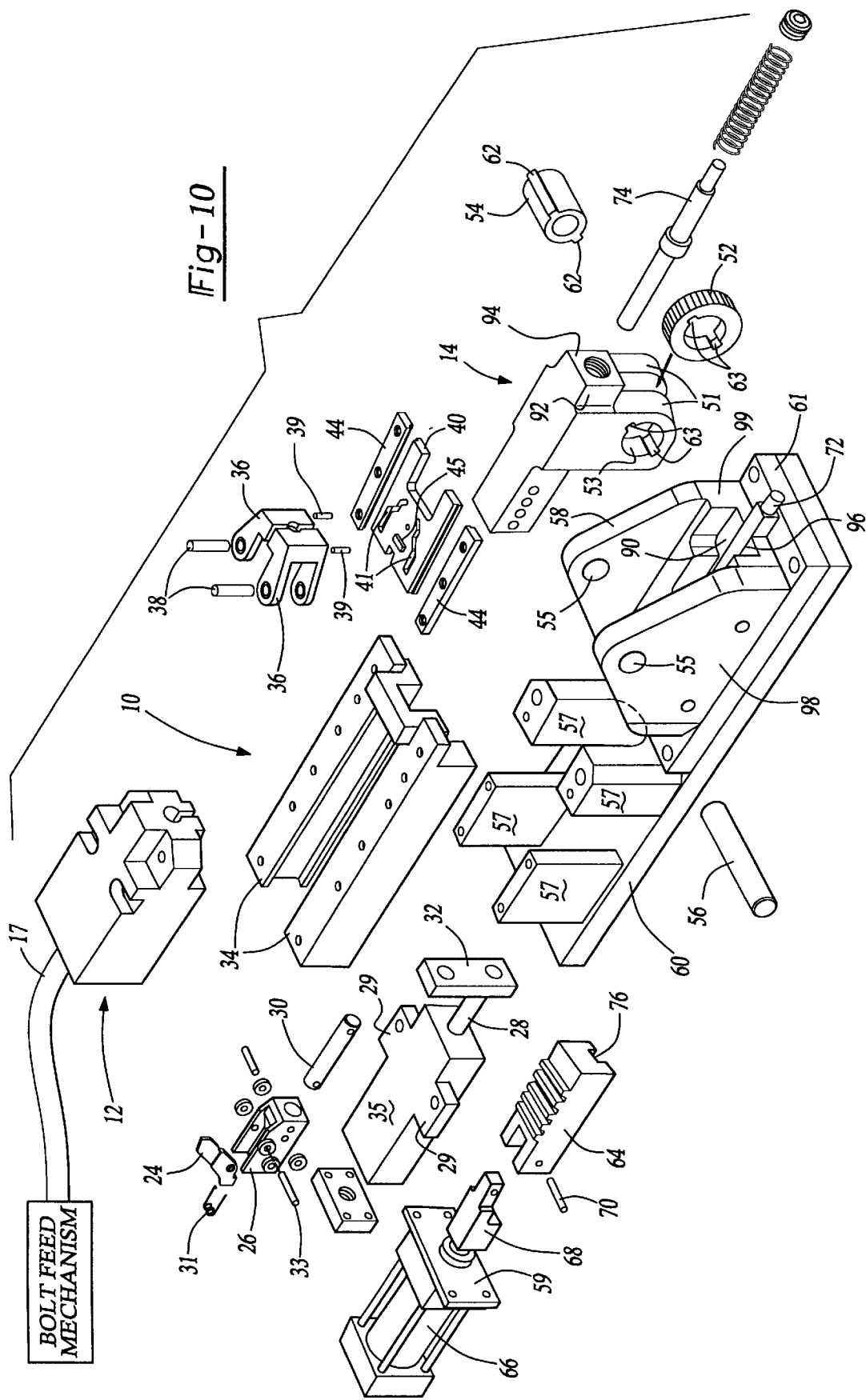

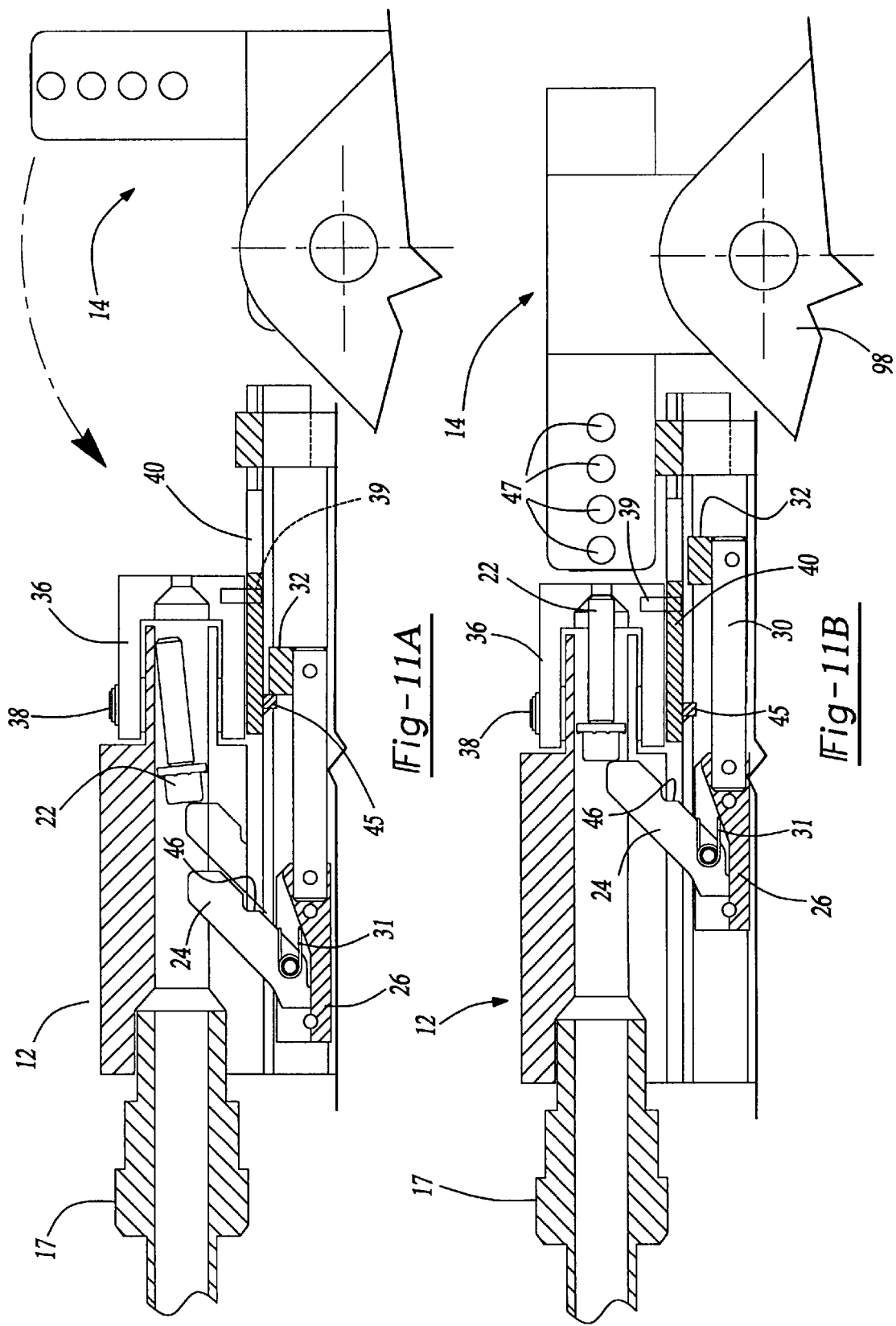

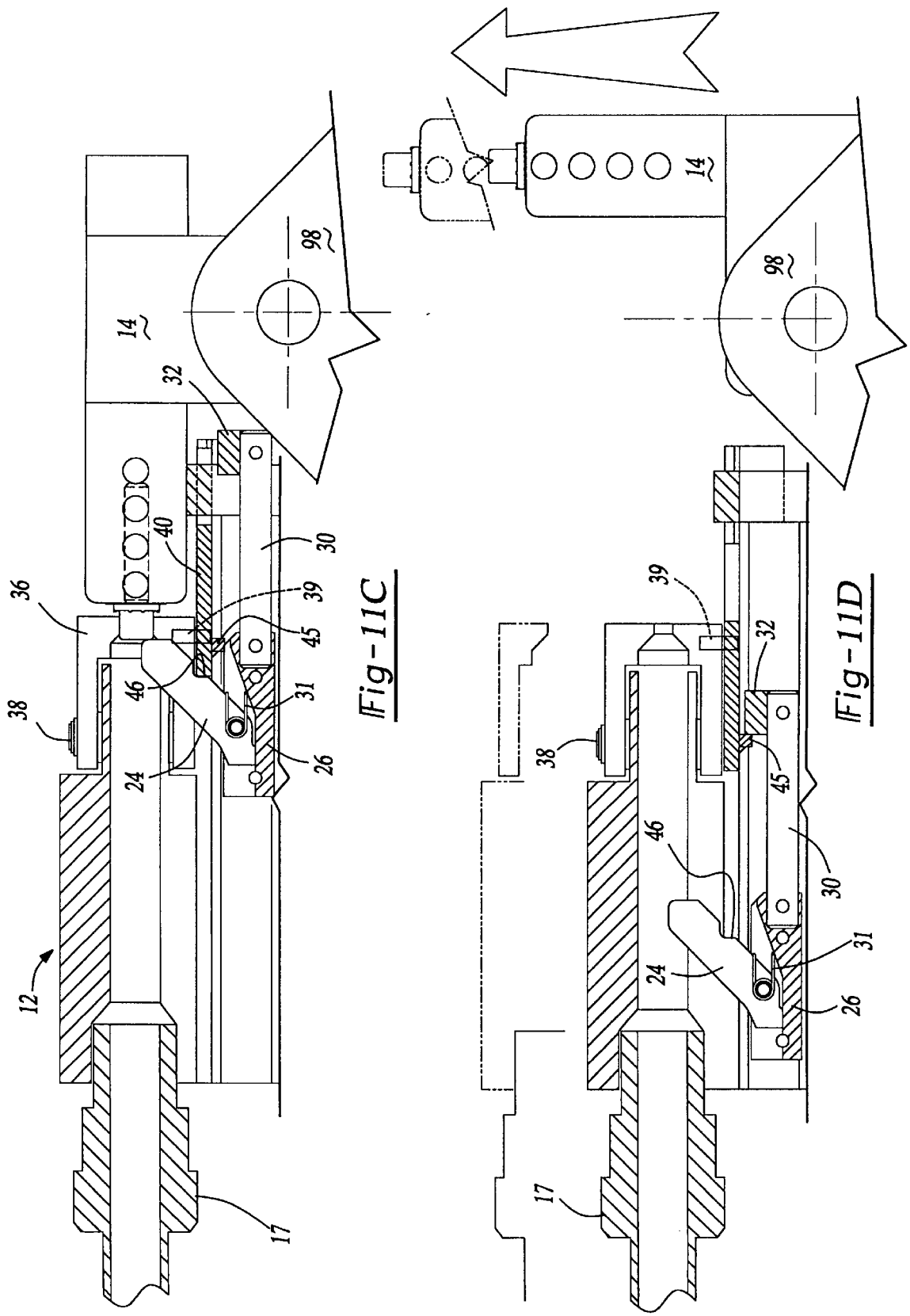

FASTENER INSTALLATION HEAD HAVING A PIVOTING FASTENER DRIVE ASSEMBLY

This application claims priority from U.S. Provisional Application Ser. No. 60/070,641, filed Jan. 7, 1998.

The present invention relates to a fastener installation head for installing fasteners in a workpiece. More particularly, the present invention discloses an installation head which has a pivoting driver and can install fasteners at any orientation, such as above, below, to the side, or at any angle in between. The ability to pivot the installation driver reduces the overall size of the installation head and allows the installation head to be positioned at various angles within, for example, a stamping press.

BACKGROUND

Installation heads for installing fasteners, such as for example studs are well known. An example of stud fastener installation heads can be found in U.S. Pat. No. 5,172,467. This patent is assigned to the assignee of the present invention which has a number of other patents directed to fastener installation heads for stud type fasteners and for female fasteners.

All known installation heads must overcome the problem of orienting the fastener within the head. If the fastener is not properly oriented, the fastener cannot be properly installed and in some instances the head can be damaged. The problem is particularly acute with stud type fasteners, and is even more of a problem with fastener heads that attempt to install the fastener, in the up direction or at an angle.

With reference to U.S. Pat. No. 5,172,467, a self-attaching installation apparatus is disclosed. This particular installation apparatus is particularly, although not exclusively, adapted for installation of stud-like fasteners. Stud-like fasteners have a projecting portion, such as a shank, extending from the body or head portion of the fastener. This type of fastener presents unique installation problems in mass production because the elongated fastener must be accurately oriented in the head and aligned with the die button to prevent damage to the installation apparatus.

Self-attaching stud fasteners are particularly adapted for transfer from a hopper or other source of fasteners to the installation head through for example, a flexible tube. The installation head receives the self-attaching fasteners, orients the fasteners for installation and drives the fastener against the panel and into a die member to form the fastener and panel assembly. In a typical application, the die button is located on the bottom shoe of a mechanical, hydraulic or pneumatic press, such as utilized by the automotive industry to form panels, brackets and the like. The installation head may be attached to the upper reciprocating die shoe, such that a fastener is attached to the panel with each stroke of the press. It will be understood, however, that the die press may include several installation apparatus assemblies, wherein several fasteners are installed with each stroke of the press.

The installation heads shown in FIGS. 15 and 20 of the '467 patent are fed fasteners which depend upon the fastener being installed in the down position or at most at a downwardly directed angle. The installation head receives fasteners from the tube coupling which is coupled to a hopper of stud fasteners. In the head illustrated in FIG. 15, the fasteners are blown by pneumatic pressure into the conical opening where it is automatically centered and oriented in the conical opening. As will be appreciated by those of ordinary skill in the art, the conical opening must be facing down to automatically orient the fastener. If the conical opening is facing up, the fastener will fall out of the opening or not align properly. In fact, with this installation head, unless the opening is at a generally right angle to the generally horizontal work surface into which the fastener is to be installed the fastener will not be properly aligned.

The conical recess in the nose member is composed of at least two spring biased members, each member having mating concave generally conical surfaces normally supporting the annular wall portion of the fastener and the plunger is adapted to drive the oriented fastener against the conical surface, spreading the spring biased members and installing the fastener in the panel. In the disclosed embodiment, the base member is attached to the moveable platen of a press and the base and nose members are interconnected by a piston. The piston is adapted to move the nose member, relative to the base member, to receive the fastener body portion free end in the plunger bore and the actuating means then operates the press to close the space between the base and nose members, driving the plunger through the plunger passage to install a fastener in the panel.

Another installation head is illustrated, see FIG. 20, which includes a housing having an elongated plunger reciprocal in a plunger passage, as described above, and a feed transfer means transferring fasteners to the plunger passage. The plunger includes a longitudinally extending bore configured to receive the elongated body portion or shank of the stud-like fastener. The end of the plunger is adapted to bear against the body portion of the fastener to drive the fastener into the panel, as described. The plunger is formed of at least two longitudinally extending mating parts intersecting the bore in the end of the plunger, including a first part having a concave portion of the bore facing the transfer means and a second relatively moveable plunger part adapted to close the bore and block the transfer path. The installation head includes actuation means adapted to longitudinally move the second plunger part, relative to the first plunger part, thereby opening the concave bore portion of the first plunger part. The transfer means then transfers a fastener to receive the fastener elongated body portion or shank in the plunger first part bore portion, orienting the fastener for installation. The actuation means then closes the second plunger part around the fastener elongated body portion or shank, ready for installation. Finally, the actuation means drives the plunger through the plunger passage and installs the oriented fastener in the panel.

In this embodiment, the transfer mechanism relies upon gravity to properly orient the fastener for transfers to the plunger. The transfer mechanism includes a shuttle piston which is actuated by a pneumatic piston. The piston moves the shuttle to the left moving a stud fastener from the position shown in FIG. 20 to the position shown in FIG. 23. The shuttle forces the shank of the fastener past the ball detentes (see FIG. 21) into engagement with rod magnets.

The stud fastener is dropped from the position 300a shown in FIG. 20, through the enlarged opening of the key hole slot 480 against the projecting plate 486. The die press is then actuated, lowering the upper platen, which closes the split plunger assembly as shown in FIG. 24. The upper plunger is thereby pressed into the cylindrical cartridge guide which presses against the upper annular portion of the second lower plunger member, closing the split plunger assembly and closing the axial bore in the end of the lower plunger as shown in FIG. 24. In the final installation, the upper die shoe platen engages the upper plunger, driving the self-piercing and riveting wall into a panel located on the die button, as shown in FIG. 25. The shuttle is now fully retracted and a stud fastener is dropped into the shuttle, as shown.

This embodiment wouldn't be able to transfer the fastener to the plunger if the installation head was oriented with the plunger pointing up. Although the plunger could install a fastener in the up direction, there is no disclosed method to properly feed the fastener to the plunger.

A still farther problem with both of the above installation heads is the increased size and complexity of these heads due to the need to properly feed and orient the fasteners. Again, the installation of stud type fasteners requires an accurately oriented fastener with respect to the plunger, panel into which the fastener is to be installed, and the die button. Both of these prior art heads require a fairly large and complex feeding system to insure the proper orientation of the fastener with respect to the plunger and the work surface.

SUMMARY OF THE INVENTION

The installation head of the present invention includes a driver that positively receives a fastener and holds that fastener as the installation head travels through the installation path to install the fastener. The driver is adapted to pivot between a loading position, wherein the fastener is loaded into the driver, and an installation position wherein the driver is positioned for installing the fastener. In the disclosed embodiment, these two positions are at 90° angles to one another; however, it will be understood by those of ordinary skill in the art that the installation head of the present invention can be used at any angle and the driver could move between angles greater or lesser than 90°

The installation head of the present invention includes a mounting base for mounting the installation head to the platen of a press. A driver for driving a fastener into the workpiece is pivotally mounted to the mounting base to pivot between a load position wherein a fastener can be loaded into the driver and an installation position wherein the driver is positioned to install the fastener into a workpiece. A feed block is provided for feeding fasteners to the driver. The feed block includes a guide for guiding the fastener within the feed block to the load position. The feed block includes guide jaws which guide the fastener as the fastener exits the feed block and begins to enter the driver. The jaws are controlled by a cam plate that is operatively connected to the jaws. The cam plate is mounted for movement between a first position that is spaced from the end of the feed block and corresponds to the jaws being closed and a second position adjacent to the end of the feed block which corresponds to the jaws being fully open. The jaws move in a timed relationship so that they initially open only partially to allow the projecting portion, the shank, to first protrude from the feed block and begin to enter the driver and then the jaws spring fully open so that the head portion of the fastener can clear without being obstructed by the jaws. The driver has a recess for receiving the shank portion of the fastener and retaining balls within the driver to hold the shank portion within the driver.

Once the installation head detects the existence of the fastener fully inserted into the driver, the driver is then rotated to the installation position so that the fastener can be installed by the driver. In the disclosed embodiment, two pneumatic cylinders are used to control the feed block and the driver rotation. The driver is mounted upon a pinion that is connected to a rack that is in turn connected to one cylinder. As the cylinder extends and retracts, the rack moves in rectilinear motion with respect to the pinion to rotate the pinion and then rotate the driver between the installation and load positions. The feed block cam is connected to the second cylinder which moves the cam in a rectilinear manner that then controls the opening and closing of the jaws.

It will be understood that the self-attaching fastener of the present invention may be of almost any configuration. For example, the fastener may be a stud, bolt, nut, ball joint, etc. As used herein, "fastener" refers not only to the function of the fastener to attach another structural member to the panel, but also the means of attaching the fastener to the panel. It will also be understood that the self-attaching fastener, method of attachment, and installation apparatus can be a complete system, wherein the installation apparatus is specifically adapted to install a self-attaching fastener by the method of this invention, preferably in a continuous operation.

Other advantages and meritorious features will be more fully understood from the following description of the preferred embodiments of the installation apparatus, the appended claims and the drawings, a brief description of which follows.

DESCRIPTION OF THE DRAWINGS

FIG. 5 is a view of the installation head as viewed from the feed block side of the installation head.

FIG. 6 is a view of the installation head as viewed from the mounting base side of the installation head.

FIG. 7 is a view taken along line 7—7 of FIG. 4.

FIG. 8 is an end view of the installation head showing the driver.

FIG. 9 is a view taken along line 9—9 of FIG. 4.

FIG. 10 is an exploded view of the installation head of the present invention.

FIGS. 11a through 11d are cut-away views of the installation head showing the feed block and pawl, and in particular the movement of the pawl as it guides a fastener into the driver.

DETAILED DESCRIPTION OF THE INVENTION

Figure 1:
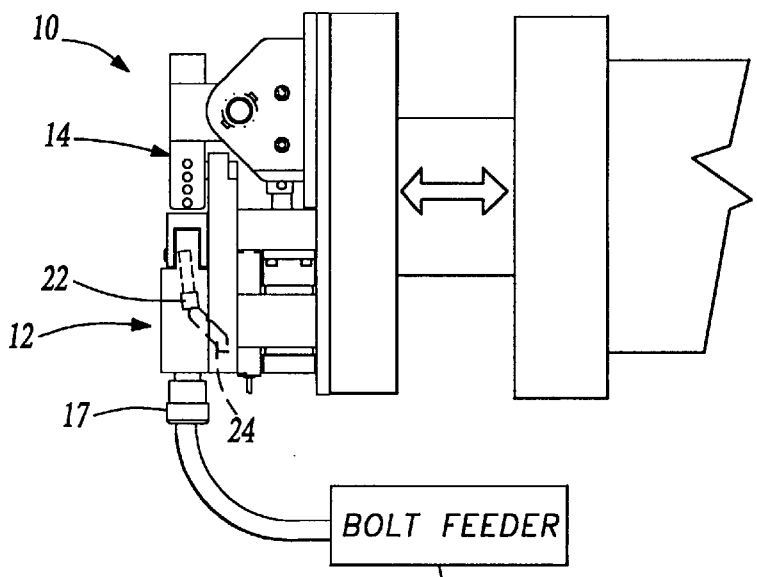
FIG. 1 is a side view of the installation head of the present invention mounted to a press with the driver in the load position and a fastener being guided to the driver.

The installation head of the present invention is shown generally at 10 in the drawings. Installation head 10 includes a fastener guide assembly 12 and a fastener driver or nose piece 14. A fastener supply mechanism is illustrated schematically at 16 for supplying fasteners to the fastener guide assembly 12. A connector, such as for example a quick connect is shown at 17 for connecting the fastener supply 16 to the guide assembly 12. Fastener supply mechanisms are well known to those of ordinary skill in the art and for this reason it has only been illustrated schematically.

Figure 2:
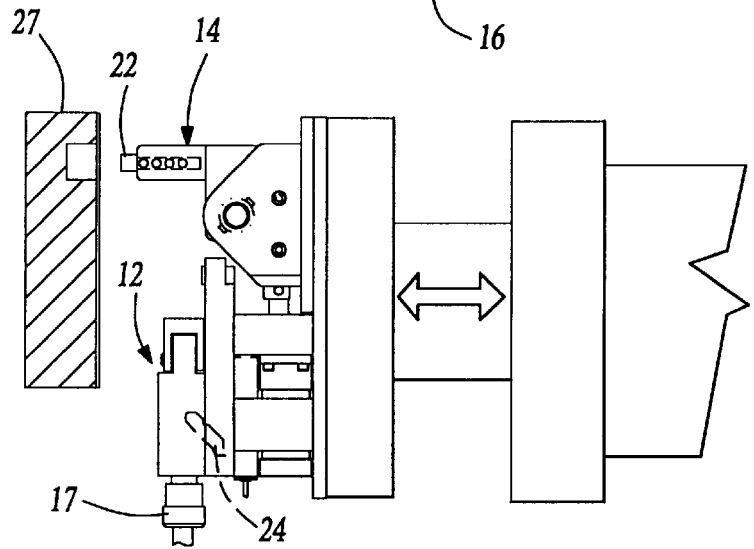
FIG. 2 is a side view of the installation head of the present invention mounted to a press with the driver in the installation position.
Figure 3:
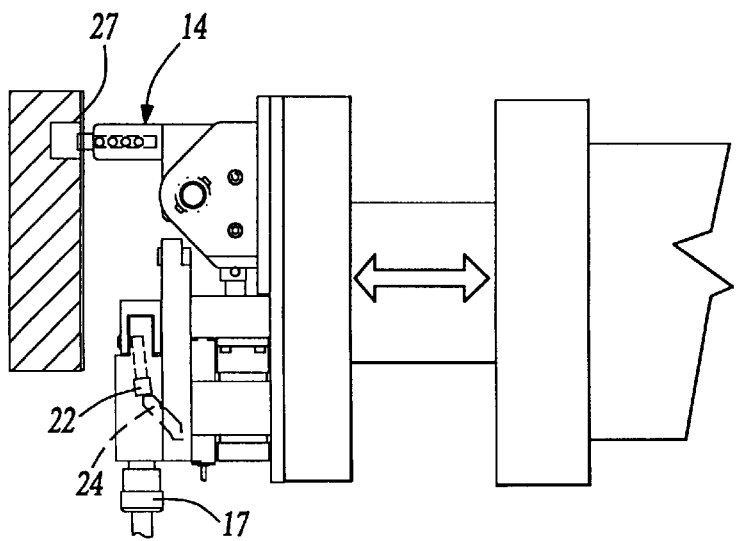
FIG. 3 is a side view of the installation head of the present invention with the driver and fastener being installed into a panel.

With reference to FIGS. 1 through 3, the general operation of the installation head 10 is illustrated. In FIG. 1, the fastener supply assembly 16 supplies a fastener, preferably a stud type fastener to the fastener guide assembly 12. The fastener guide assembly 12 guides the fastener after it has entered the guide assembly 12 to the driver 14. As illustrated in FIGS. 1 to 3, the driver 14 pivots between a fastener receiving position as shown in FIG. 1 to a fastener installation position as shown in FIG. 2 and a fastener installation position as shown in FIG. 3 where a fastener is installed in a panel 27. In the preferred embodiment, the fasteners 22 are blown into the guide assembly 12 by pneumatic pressure. The fasteners 22 blow past a feed pawl 24 and are then pushed by the feed pawl into the driver 14. Once the fastener 22 is in the driver 14, the driver 14 pivots to the installation position shown in FIG. 2. Once the driver 14 has fully pivoted to the installation position, the press closes installing the fastener 22 into a panel 27 or other work piece. Once installed, the driver 14 pivots back to the load position illustrated in FIG. 1 to receive another fastener.

Figure 4:
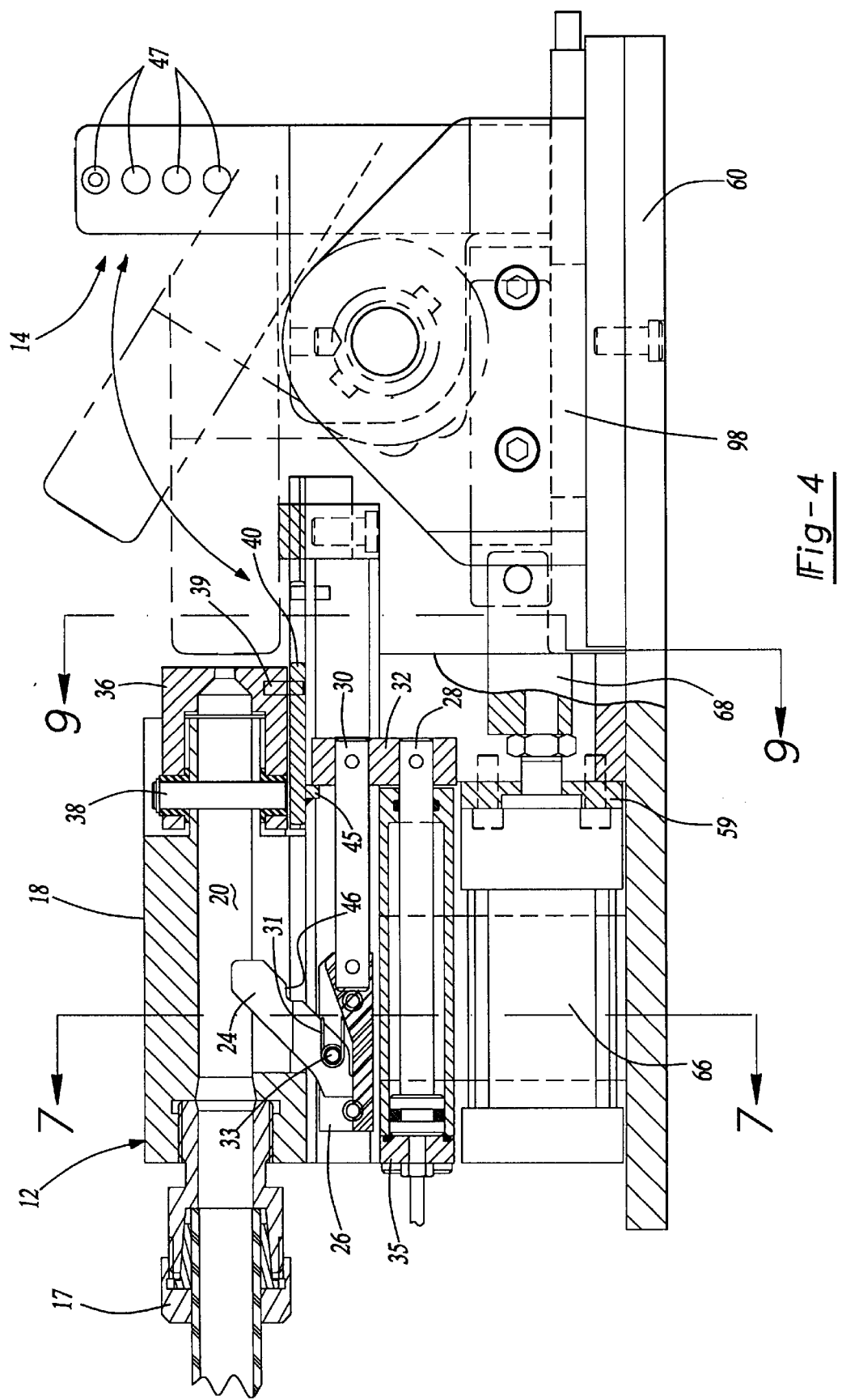
FIG. 4 is a partial cut-away side view of the installation head of the present invention.

With reference primarily to FIGS. 4 and 10, the fastener feed assembly 12 will be described. The feed assembly 12 includes a feed block 18 that has a fastener channel 20 for receipt and guiding of the fastener 22. A feed pawl 24 is positioned in the feed block 18 and extends into the channel 20. The pawl 24 is mounted to a feed clevis 26 which is in turn mounted to a cylinder 28. In the preferred embodiment, the cylinder 28 is a pneumatic cylinder, but could be a hydraulic cylinder, or could be an electric drive motor etc. A rod 30 interconnects the clevis 26 to a feed coupler 32 which is attached to the cylinder rod 28.

The pawl 24 is pivotally mounted within the feed clevis 26 upon a pivot pin 33 and is spring biased to the extended position by spring 31. In this way, the pawl 24 can be pivoted as the fastener is blown past the feed pawl 24 and then spring back to engage the fastener and move it into the driver 14. FIG. 4 illustrates the feed pawl 24 in the position to engage the fastener 22. FIGS. 11(a)–11(d) illustrate the feed pawl 24 engaging the fastener 22 and driving it into the driver 14. A track 34 guides the clevis 26 within the installation head 10.

To maintain accurate alignment of the fastener 22 as it is guided into the driver 14, pivotal jaws or fingers 36 are provided at the terminal end of the feed block 18. The jaws 36 are preferably mounted to the feed block by pivot pins 38. The jaws 36 are mechanically timed by a cam plate 40 to open and close as the fastener is guided to the nose piece 14. The cam plate 40 is mounted to the track 34 by retainer plates 44 and moves with respect to the track 34. The cam plate 40 has guide slots 41 which receive guide pins 39 extending from the jaws 36. As the cam plate 40 moves with respect to the track, the pins 39 ride within the slots 41 and pivot the jaws 36 from the initial closed position as illustrated in FIG. 5, and 12(a) to the fully open position illustrated in FIG. 12(e).

Movement of the plate 40 causes the jaws 36 to open and close in a timed manner to control the fastener 22. The jaws are initially opened by the fastener 22 forcing them open and are further opened by moving the cam plate 40 toward the driver 14. The feed pawl 24, in the disclosed embodiment, has a notch 46 that engages the cam plate 40 to move the plate 40. The jaws 36 are returned to the closed position by engagement of the feed coupler 32 with tab 45 on the cam plate 40, see FIG. 4. As the feed coupler 32 retracts, it engages the tab 45 and pulls the cam plate 40 away from the nose piece 14 and causes the slots 41 to guide the pins 39 to close the jaws 36.

Figure 12A:
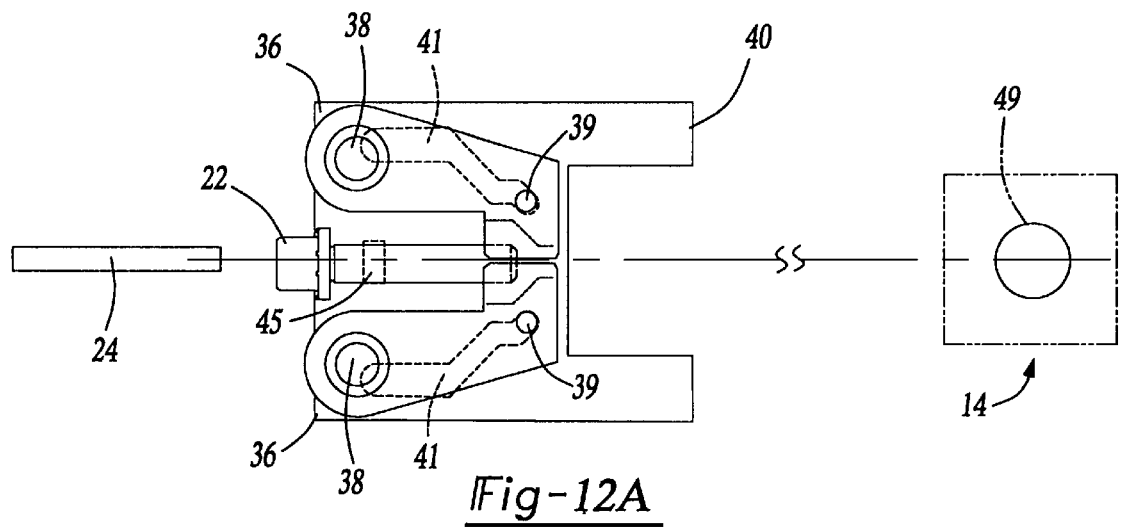
FIGS. 12a through 12f are partial views of the installation head jaws showing their position during loading of a fastener into the installation head.
Figure 12B:
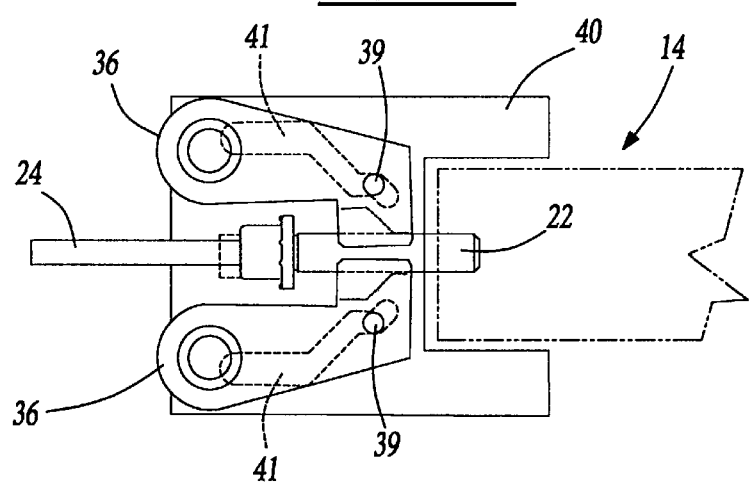
Figure 12C:
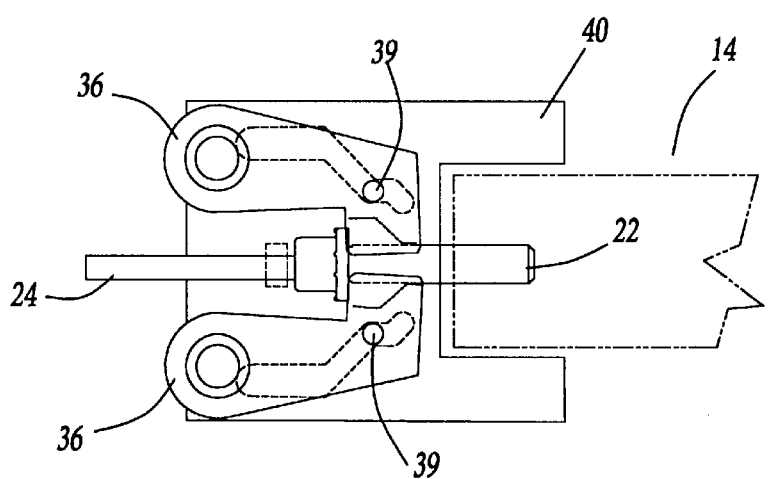
Figure 12D:
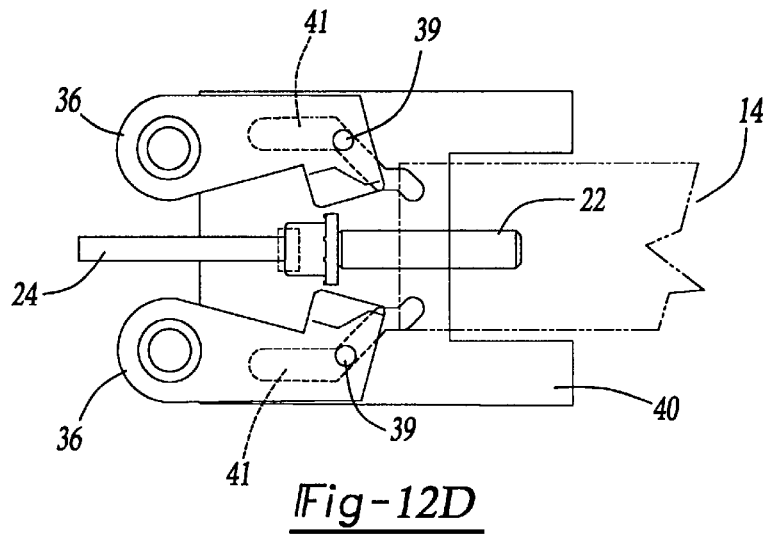
Figure 12E:
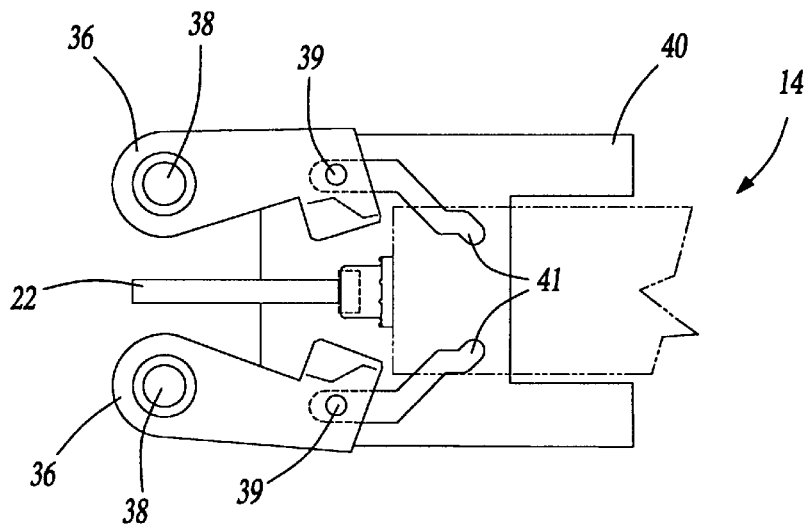

The movement of the jaws 36 are shown in FIGS. 12A–F. The jaws are initially closed as shown in FIG. 12a. The feed coupler 32 is forced against the tab 45 to positively close the jaws and thus the feed block 18 to prevent the fastener 22 from being blown out of the feed block 18. In this position, the guide pins 39 are in the ends of the slots 41. As can be seen, the guide slots 41 diverge outwardly with respect to one another in an angled path.

As the pawl 24 pushes the fastener forward, the jaws 36 are opened to the position illustrated in FIG. 12B. In this position, the fastener 22 is being delivered to the driver 14. The fastener 22 continues to move with the cam plate 40 remaining stationary until the notch 46 engages cam plate 40. In this way, the jaws 36 guide the fastener 22 as the pawl pushes it into the driver 14. With reference to FIG. 12C, the pawl 24 has just contacted the plate 40 and moved it slightly, but not moved the jaws 36. As can be seen, the path in the cam plate 40 is straight allowing the cam plate 40 to be moved with respect to the jaws 36 with the jaws 36 remaining fixed. The opening between the jaws is just wide enough to allow the fastener 22 to pass between them and enter the driver 14.

Figure 12F:
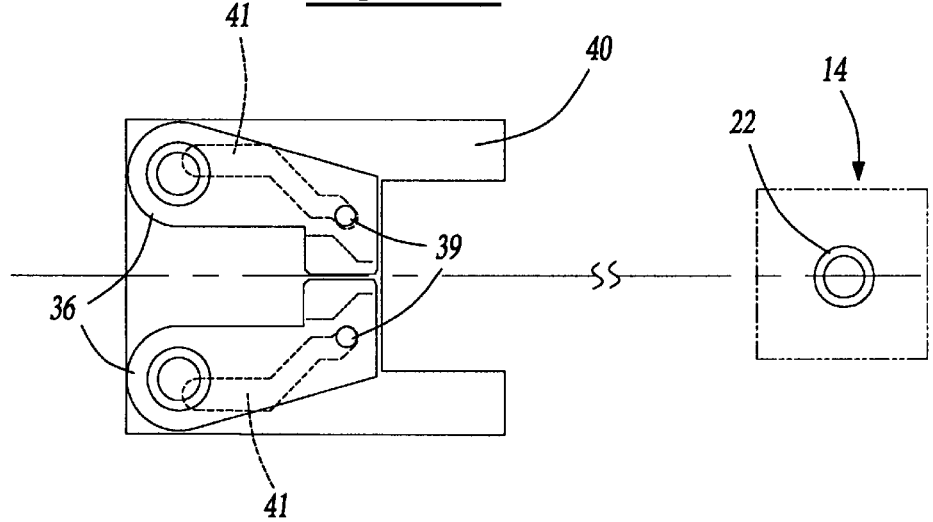

Once the fastener 22 has been delivered to the driver 14, the jaws snap open to not interfere with further movement of the fastener 22 as it is fully inserted into the nose piece 14. The movement of the jaws 36 to clear the fastener 22 is illustrated in FIGS. 12 D–E. As can bee seen, the guide slots 41 are angled to allow the jaws 36 to be opened and then terminate in a straight path allowing the jaws 36 to remain open as the fastener 22 is fully pushed into the driver 14. In FIG. 12F, the driver 14 has rotated to the installation position and the cam plate 40 has been drawn back to the closed position by the feed coupler 32 engaging the tab 45.

The jaws 36 open uniformly due to the dual control by the single cam plate 40. As should be appreciated, this dual control ensures uniform movement of the jaws 36 and prevents the fastener 22 from being misaligned during transfer from the feed block 18 to the driver 14. Furthermore, the fastener 22 is guided by the jaws 36 until the fastener 22 is received within driver 14 providing a transfer of alignment between the jaws 36 and driver 14. The dual controlled jaws 36 provide simultaneous and continuous alignment and control of fastener 22.

Once transfer of alignment and control of the fastener 22 has occurred, the fingers snap out of the way to give alignment and control of fastener 22 exclusively to driver 14. It should be appreciated that if the jaws 36 didn't snap out of the way, the fastener could become locked between the jaws 36 and the driver 14. Once the transfer between jaws 36 and driver 14 has occurred, the jaws 36 are no longer involved in the fastener 22. Control and alignment has completely shifted to driver 14.

FIGS. 11A and 11B correspond to FIG. 12A with the fastener 22 being received in the fastener feed block 18 and forced by the feed panel 24 in the direction of driver 14. FIG. 11C corresponds to FIG. 12E with the fastener 22 being fully loaded with the driver 14. FIG. 11D corresponds to FIG. 12F with the driver 14 in the installation position to drive a fastener into the work surface or panel 27.

The driver 14 includes retention balls 47 that retain the fastener 22 in the driver 14. The retention balls 47 are spring loaded to extend into the opening 49 in the end of the driver. As the fastener 22 is inserted into the driver 14, the balls are moved outwardly compressing the springs which force the balls into engagement with the fastener 22 holding it in the driver 14.

The feed assembly 12, and track 34 are mounted to the spacers 57 which are in turn mounted to the plate 60. The cylinder 28 is mounted to through ears 29 to the track 34 and track 34 is mounted to spacers 57.

With reference to FIGS. 4 and 10, the movement of the driver 14 will be described. As illustrated, the driver 14 rotates 90° between the installation position shown in solid lines and the load position shown in broken lines. It should be understood by those of ordinary skill in the art that the angle of rotation could be any desired angle. The driver 14 has a pinion 52 mounted between arms 51. The pinion 52 is mounted on a steel bushing 54 which is slip fit into an opening 53 in the arms 51. The bearing 54 has keys 62 that mate with key ways 63 in the pinion 52 and opening 53. The bushing 54 receives a dowel pin 56 that is fixed with hole 55 in mounting ear 58. The mounting ear 58 is a part of the base 99 which is mounted to the base plate 60 which mounts to the press, as illustrated in FIGS. 1–4. The bushing 54 rotates upon the fixed dowel pin 56 via a bronze bearing pressed into bushing 54. A cover plate 98 is bolted to base 99.

As illustrated in FIG. 10, the driver 14 is rotated into a recess or channel 90 formed in the base 99. The driver 14 has a head portion 92 that is received within the recess 90. The path of rotation of the driver 14 allows the head portion to be received in the recess 90 and allows the top 94 of head 92 to contact the bottom 96 of the recess. The pivot axis of the driver 14, defined by pin 56 is off center to allow the head 92 to be received in the recess 90 in this manner. With the head 92 engaging the base, forces upon the driver are directed through the driver 14 and not through the pivotal connection.

A rack 64 mates with the teeth on the pinion 52. The rack is coupled to a coupler 68 through a connecting pin 70. The coupler connects the rack 64 to a cylinder 66. In the preferred embodiment, the cylinder 66 is a pneumatic cylinder and is mounted to the spacers 57 by a mounting bracket 59. When the cylinder 66 extends and retracts, the rack 64 causes the pinion 52 to rotate and rotates the driver 14.

To ensure proper operation of the installation head 10, the preferred embodiment uses proximity indicators 71 and 72 and a probe rod 74. Proper operation requires that the driver 14 be rotated to the load position before the fastener 22 is driven into the driver and that the fastener 22 be properly inserted into the driver 14 before the driver is rotated to the installation position. The proximity indicator 72 indicates when the driver 14 is in the load position. Indicator 71 indicates the feed pawl 24 has inserted the fastener completely into the driver. Indicator 72 is illustrated in FIG. 10. The indicator 72 detects the rack 64 at the end of its stroke. The rack 64 has a detection recess 76 which is aligned with the sensor portion 73 of indicator 72. The indicator may be a contact type indicator that requires contact with the rack 64 or a remote sensor which senses the presence of the rack 64, such as for example using a light source. In the preferred embodiment, the indicator 72 requires the presence of the rack before the cylinder 28 can be energized to force the fastener 22 into the driver 14. When the indicator 72 senses the full extension of the cylinder 28, the driver can be rotated back to the installation position which is detected by proximity indicator 72 (if a fastener is present, via rod 74). The cylinder 28 can be retracted simultaneously with cylinder 66. When indicator 72 senses the presence of a fastener in driver 14 in the installation position, the press is allowed to close and install the fastener.

In the preferred embodiment, the proximity indicator 71 is place inside the cylinder and detects movement of the piston of cylinder 28. Indicator 71 indicates to the driver 14 that it can return to the install position. It ensures that there is no jamming of fasteners in the feed block.

The indicator 72 indicates the position of the driver 14 when the fastener is present. The fastener pushes rod 74 to actuate indicator 72. The indicator 72 indicates the presence of a fastener in the driver 14 and the correct position of driver 14 in the install position.

As will be understood by those skilled in the art, various modifications may be made to the installation head of the present invention within the purview of the appended claims. For example, as described above, the driver may be rotated through a path of greater or less than 90°. Further, the fastener may be held within the driver in a manner that does not employ the spring loaded balls, for example magnets could be used to secure the fastener 22 within the driver 14. Other probes and indicators may be used to confirm and verify the location of the several moveable parts of the installation head. Other methods of mounting the driver may be employed and other than pneumatic cylinders may be used to operate the various elements. Still further, a single cylinder could be used instead of the dual cylinder. Having thus described the installation head of the present invention, the invention is now claimed, as follows:

What is claimed:

1. An installation head for installing a fastener into a workpiece, said installation head comprising:

a mounting base for mounting said installation head to an installation assembly for installing a fastener into the workpiece;

a driver for driving a fastener into the workpiece, said driver having first and second ends, said driver being pivotally mounted to said mounting base to pivot between a load position wherein a fastener can be loaded into said first end of said driver and an installation position wherein said second end of said driver engages said mounting base;

a fastener guide for guiding fasteners to said driver when said driver is in said load position, said fastener guide having guide jaws for guiding said fastener to be properly positioned with respect to said driver to properly orient said fastener with respect to said driver;

whereby fasteners are supplied from a supply of fasteners to said fastener guide and guided to said driver when said driver is in said load position, said driver being adapted to rotate to said installation position once a fastener has been properly positioned within said driver.

2. The installation head of claim 1, wherein said fastener guide includes a pawl guiding a fastener through said fastener guide to said driver.

3. The installation head of claim 2, wherein said fastener guide has opposed ends with said first end spaced from said driver and said second end adjacent said driver and in operative communication with said driver when said driver is in said load position, said jaws are positioned adjacent to said second end and a cam plate is operatively connected to said jaws, said cam plate being mounted for movement between a first postion spaced from said second end with said jaws being closed and a second position adjacent to said second end with said jaws being fully open.

4. The installation head of claim 3, wherein said cam plate includes opposed slots that diverge outwardly and are angled to control said movement of said jaws between said closed and open positions.

5. The installation head of claim 4, wherein said slots diverge in the direction of said first end from said second end, said slots having a first location corresponding to said jaws being in said closed position, said first location leading to a second position corresponding to said jaws being slightly open to a position sufficiently wide to allow said fastener to be partially directed into said driver and a third position wherein said jaws are fully open to allow said fastener to pass said jaws without obstruction.

6. The installation head of claim 5, wherein said cam plate is operatively connected to a drive cylinder.

7. The installation head of claim 6, wherein a coupler connects said cam plate to said drive cylinder, said coupler having a tab that is adapted to engage said cam plate to pull said cam plate away from said second end and close said jaws.

8. The installation head of claim 1, wherein said driver has a recess for receipt of said fastener.

9. The installation head of claim 8, wherein said recess includes biased balls that are biased into said recess for frictional engagement with said fastener when said fastener is inserted into said driver, whereby said fastener is held within said driver.

10. The installation head of claim 1, further including a rack and pinion for rotating said driver, said driver being mounted upon said pinion for rotation about an axis, said rack mating with said pinion and being mounted for rectilinear movement with respect to said pinion to rotate said pinion about said axis.

11. The installation head of claim 1, further including proximity sensors for sensing the relative location of said driver and said fastener as said driver rotates between said load and installation positions.

12. An installation head for installing fasteners into a workpiece, said installation head comprising:

a fastener feed passage for feeding fasteners to be installed into said workpiece, said fastener feed passage having an opening for said passage of fasteners and jaws positioned about said opening for controlling the position of said fastener as said fastener is discharged from said opening of said fastener feed passage, and a cam plate interconnected to said jaws to control the position of said jaws;

a driver pivotally mounted adjacent said fastener feed passage adapted to receive fasteners from said fastener feed passage and rotate to an installation position that is at an angle to said fastener feed passage, said driver being adapted to retain said fastener as said driver is driven to said work surface to install said fastener into said workpiece;

whereby said driver rotates between said fastener load position and a fastener install position to first receive a fastener for installation and then to rotate to said installation to install said fastener into said workpiece.

13. The installation head of claim 12, wherein said cam plate includes slots defining a control path for controlling the movement of said jaws and said jaws include guide pins mounted within said slots which follow said slots as said cam plate moves to open and close said jaws.

14. The installation head of claim 13, wherein said slots diverge outwardly to open and close said jaws as said cam plate moves back and forth with respect to said jaws.

15. The installation head of claim 12, wherein said driver is pivotally mounted to pivot about a pivot axis that extends generally laterally to said fastener feed passage.

16. The installation head of claim 15, wherein said driver is mounted upon a pinion which pivots about said pivot axis.

17. The installation head of claim 16, further including a rack operatively connected to said pinion, and mounted for rectilinear movement with respect to said pinion to rotate said pinion and attached driver about said pivot axis between said load position and said installation position.

18. The installation head of claim 12, further including proximity sensors operatively associated with said driver and said fastener feed passage to sense said position of said driver relative to said load position and said installation position and to sense said presence of a fastener in said driver.

* * * * *